US009489887B2

(12) United States Patent
Wacyk et al.

(10) Patent No.: US 9,489,887 B2
(45) Date of Patent: Nov. 8, 2016

(54) AMOLED MICRODISPLAY DEVICE WITH ACTIVE TEMPERATURE CONTROL

(75) Inventors: Ihor Wacyk, Hopewell Junction, NY (US); Olivier Prache, Hopewell Junction, NY (US)

(73) Assignee: eMagin Corporation, Hopewell Junction, NY (US)

( * ) Notice: Subject to any disclaimer, the term of this patent is extended or adjusted under 35 U.S.C. 154(b) by 37 days.

(21) Appl. No.: 13/434,893

(22) Filed: Mar. 30, 2012

(65) Prior Publication Data

US 2012/0249516 A1 Oct. 4, 2012

Related U.S. Application Data

(60) Provisional application No. 61/470,788, filed on Apr. 1, 2011.

(51) Int. Cl.
*G06F 3/038* (2013.01)
*G09G 3/32* (2016.01)

(52) U.S. Cl.
CPC ...... *G09G 3/3233* (2013.01); *G09G 2300/043* (2013.01); *G09G 2310/0262* (2013.01); *G09G 2320/041* (2013.01)

(58) Field of Classification Search
CPC ................ G09G 2320/041; G09G 2320/043; G09G 3/325
USPC .......................................................... 345/212
See application file for complete search history.

(56) References Cited

U.S. PATENT DOCUMENTS

| | | | | |
|---|---|---|---|---|
| 4,723,835 | A * | 2/1988 | Franklin | 349/161 |
| 6,879,172 | B1 * | 4/2005 | Eppes et al. | 324/750.03 |
| 7,161,368 | B2 * | 1/2007 | Huber et al. | 324/750.03 |
| 7,385,582 | B2 * | 6/2008 | Hudson | 345/101 |
| 2006/0125734 | A1 * | 6/2006 | Cok et al. | 345/76 |
| 2006/0152454 | A1 * | 7/2006 | Cok | G09G 3/3208 345/82 |
| 2006/0244695 | A1 * | 11/2006 | Komiya | 345/76 |
| 2007/0176913 | A1 * | 8/2007 | Satou | 345/204 |
| 2010/0140455 | A1 * | 6/2010 | Nathan et al. | 250/214 A |

* cited by examiner

*Primary Examiner* — Towfiq Elahi
(74) *Attorney, Agent, or Firm* — Kaplan Breyer Schwarz & Ottensen, LLP; Janine D. Geraigery, Esq.

(57) ABSTRACT

An active-matrix organic light-emitting diode microdisplay device having a temperature control system including a temperature sensor and a control means for regulating the temperature of the OLED. The temperature is regulated by a bias transistor within the circuit, operating as a function of the temperature of the panel, such that low panel temperatures cause an increase in voltage of the bias transistor which draws a higher current through the top voltage drive transistor for self-heating the area surrounding the OLED.

12 Claims, 1 Drawing Sheet

AMOLED MICRODISPLAY DEVICE WITH ACTIVE TEMPERATURE CONTROL

CROSS-REFERENCE TO RELATED APPLICATION

This application claims the benefit of provisional patent application Ser. No. 61/470,788 filed in the U.S. Patent and Trademark Office on Apr. 1, 2011.

BACKGROUND OF THE INVENTION

1. Field of the Invention

This invention relates generally to pixel driver circuits for active-matrix organic light-emitting diode (AMOLED) displays and microdisplays, and more particularly, to such a circuit that includes active temperature control through the use of an on-chip heater to reduce the level of the voltage bias necessary to operate the display over a wide temperature range, especially below 0° C., and at high luminance levels.

2. Description of the Related Art

Organic light emitting diode (OLED) devices are known to shift their current-voltage characteristics dramatically over temperature, with a large increase occurring at temperatures below 0° C. As a result, the silicon backplane must handle drive voltages that exceed the capability of typical CMOS technology. This is currently accomplished by applying a portion of the required bias voltage, namely the negative cathode supply, to all the pixels in common and tied to the silicon substrate ground potential. This approach provides the ability to operate AMOLED microdisplays over a wide temperature range (−50 to 70° C.) but at the expense of design complexity, additional external components, and limitations to the pixel size reduction.

The use of an on-chip heater to raise the OLED temperature rapidly above 0° C. at very low ambient temperatures will eliminate the need for a negative cathode supply. The heating can be supplied by applying power to a resistive thin-film located above the OLED layer, such as an indium-tin-oxide (ITO) layer, and regulating the power according to the ambient temperature.

While these units may be suitable for the particular purpose employed, or for general use, they would not be as suitable for the purposes of the present invention as disclosed hereafter. Specifically, the present invention raises the OLED temperature by dissipating power in actively controlled devices found in the silicon drive circuitry located below the OLED layer, such as the BIAS transistor used in the voltage pixel driver of the preferred embodiment.

It is, therefore, a primary object of the present invention to operate an AMOLED microdisplay over a wide temperature range (−50 to 70° C.) using the present and advantageous circuit design architecture without compromising design complexity, adding external components or limiting the pixel size reduction.

It is, therefore, a primary object of the present invention to provide a pixel circuit that reduces the voltage bias over a wide temperature range, especially below 0° C., and at high luminance levels.

It is, therefore, another object of the present invention to reduce the complexity and cost of the silicon backplane and external electronics used for the AMOLED microdisplay.

It is, therefore, another object of the present invention to provide a path to further miniaturization of the pixel drive circuit.

It is, therefore, another object of the present invention to operate the circuit over a more limited temperature range for the OLED, such that the optical performance of the AMOLED microdisplay is significantly improved.

BRIEF SUMMARY OF THE INVENTION

In accordance with one aspect of the present invention, a self-heating drive circuit for an active-matrix organic light-emitting diode (AMOLED) microdisplay device for use with a reference voltage source is disclosed. The OLED is operably connected to the reference voltage source through a NMOS drive transistor configured as a voltage follower.

The circuit includes a means for detecting the temperature of the microdisplay device and a means for reducing the voltage bias by controlling the forward bias of the drive transistor, thus heating the AMOLED as a function of the temperature of the microdisplay.

In accordance with an additional embodiment an active matrix organic light-emitting diode (AMOLED) microdisplay device is provided that includes a panel having a top voltage drive transistor, a bias transistor and an organic light-emitting diode. The device further includes a temperature control system in communication with the bias transistor.

The temperature control system has a temperature sensor for detecting the temperature of the panel and is capable of heating the organic light emitting diode when the temperature of the panel falls below a predetermined threshold temperature.

The temperature control system has a means for reducing the voltage bias by regulating the voltage of the bias transistor as a function of the temperature of the panel. Hence, low panel temperatures actuate an increased voltage of the bias transistor and draw a higher current through the top voltage drive transistor for self-heating the panel.

In accordance with an additional embodiment an active matrix organic light-emitting diode (AMOLED) microdisplay device is implemented with a temperature control means and management means.

The device includes a temperature sensor built into the silicon backplane of an AMOLED microdisplay device for measuring the temperature of the device and generating an output by a voltage control oscillator (VCO) as a temperature measurement signal.

The device further includes a temperature control system for controlling the voltages of the microdisplay device and receiving the temperature signal for transmitting a digital signal to a system processor. The system processor processes the digital signal corresponding to the temperature of the microdisplay device and generates temperature dependent reference signals for inputting to the control means. The control means is able to control the voltages of the microdisplay device in response to the temperature measurement signal.

BRIEF DESCRIPTION OF THE SEVERAL VIEWS OF THE DRAWINGS

To these and to such other objects that may hereinafter appear, the present invention relates to an AMOLED microdisplay with active temperature control as described in detail in the following specification and recited in the annexed claims, taken together with the accompanying drawings, in which like numerals refer to like parts in which:

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

DETAILED DESCRIPTION OF THE INVENTION

The present invention is directed to an AMOLED microdisplay device with active temperature control.

Figure 1:
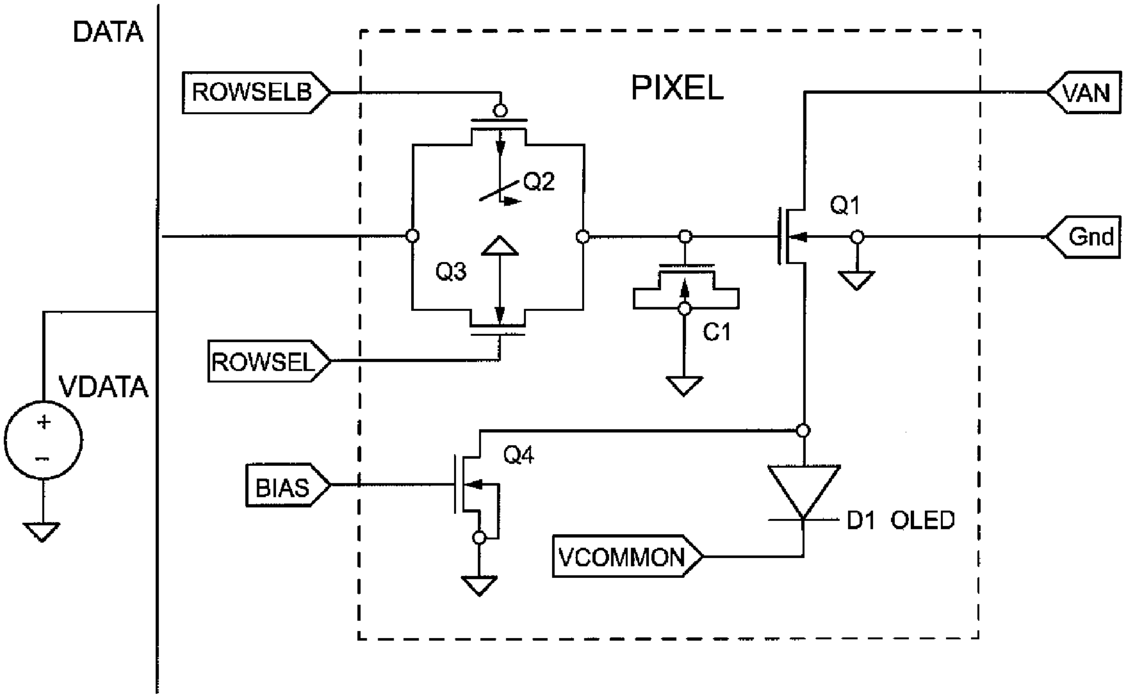
FIG. 1 is a schematic diagram of the NMOS source follower implementation of a pixel voltage drive circuit of the present invention having active temperature control within the drive circuitry.

FIG. 1 illustrates a pixel driver that is based on a voltage source consisting of a transistor Q1 and a storage capacitor C1. Transistor Q1 is preferably configured as an MOS transistor, and most likely an NMOS transistor. The voltage on the NMOS transistor sets the current in the organic light-emitting diode OLED D1. In its broadest context, the microdisplay includes a pixel area or panel having the top voltage drive transistor Q1, a bias transistor Q4 and an OLED D1.

A transmission gate consisting of a transistor Q2 and a transistor Q3 acting as switches forms the data line access switch for the pixel. Both switches are closed by control signals ROWSELB and ROWSEL, respectively, during the programming phase in order to write data into the pixel. Both are opened at the end of the programming phase. In addition, the drain to substrate junction of transistor Q4 forms a clamp diode that protects the rest of the pixel circuitry from short circuits across the OLED D1.

The microdisplay device is susceptible to a variety of disadvantages and drawbacks in functionality when the ambient temperature is low and most specifically below 0° C. The present invention includes a temperature control system 100 which self heats the OLED and panel thus providing the ability to operate AMOLED microdisplays over a wide temperature range (−50 to 70° C.) but without the expense of design complexity, additional external components, and limitations to the pixel size reduction. Specifically, the temperature control system 100 is a means for reducing voltage bias by controlling the forward bias of said drive transistor for heating the AMOLED as a function of the temperature of the microdisplay.

Figure 2:
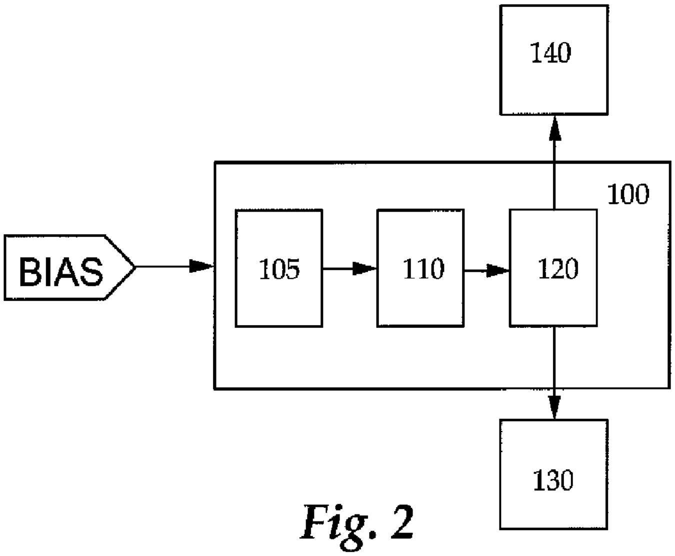
FIG. 2 is a functional block diagram for showing the interface between the bias transistor of the drive circuit and the active temperature control system for controlling the voltages of the microdisplay of the present invention.

The temperature control system 100 (shown in FIG. 2) is tied to the bias transistor Q4 or bias pin. The circuit block is tied to the bias pin. The temperature control system includes a temperature sensor 105, preferably on a backplane of the silicon wafer, for detecting the temperature of the panel. The temperature control system heats the OLED D1 when the temperature of the panel is below a predetermined threshold temperature, generally in the range of 0° C. to −50° C.

The temperature control system 100 includes a control means 120 for regulating the temperature of the OLED D1, in order to keep temperature relatively constant and maximize performance. Specifically, the control means 120 is capable of reducing voltage bias by controlling the forward bias of said drive transistor for heating the AMOLED as a function of the temperature of the microdisplay. The temperature is regulated by the bias transistor Q4 as a function of the temperature of the panel, such that low panel temperatures cause an increase in voltage of the bias transistor Q4 which draws a higher current through the top voltage drive transistor Q1 for self-heating the area surrounding the OLED D1 and the panel. Thus, also heating the OLED D1.

Preferably, the control means 120 receives temperature data from the temperature sensor and in conjunction with a management means 130 processes when the temperature falls below a predetermined threshold temperature and increases the output voltage of the bias transistor Q4. The increase in voltage from the bias transistor Q4 draws a higher current through the top voltage drive transistor Q1 and self heats the pixel area, thus raising the temperature of the OLED D1. When the control means 120 receives the temperature from the temperature sensor and the temperature is high, the management means 130 processes a decrease in the output voltage of the bias transistor Q4, thus lowering the current through transistor Q1.

In one embodiment, the control system 100 works in conjunction with a management means 130. Specifically, in this embodiment, the temperature sensor measures the temperature of the microdisplay and generates an output by a voltage control oscillator 110 (VCO) as a temperature measurement signal. Here, the temperature control system, controls voltages of the microdisplay device and receives the temperature signal for transmitting a digital signal to a system processor 140. The system processor processes the digital signal corresponding to the temperature of the microdisplay device to generate temperature dependent reference signals for inputting to the control means 120 for controlling the voltages of the microdisplay device in response to the temperature measurement signal.

The present microdisplay device therefore utilizes the advantages present with the increased current drawn from the top voltage drive transistor Q1 to self-heat the OLED D1 without affecting the signal to the OLED D1. This is unique and uncharted in the industry where it is uncommon to increase the current through transistor Q1 and bias transistor Q4, which is commonly fixed by the VCOMMON pin. However as discovered, the current prior art creates a plurality of disadvantages including use of specific silicon technologies to provide a means through the VCOMMON pin. In the present invention, rather than utilize VCOMMON tied to the ground or another small voltage, the present invention regulates the existing voltage through transistor Q1 and bias transistor Q4, thus taking advantage of current circuit design architecture.

In conclusion, herein is presented an AMOLED microdisplay device having active temperature control. The invention is illustrated by example in the drawing figures, and throughout the written description. It should be understood that numerous variations are possible, while adhering to the inventive concept. Such variations are contemplated as being a part of the present invention. while only a limited number of preferred embodiments of the present invention have been disclosed for purposes of illustration, it is obvious that many modifications and variations could be made thereto. It is intended to cover all of those modifications and variations, which fall within the scope of the present invention as defined by the following claims.

We claim:

1. An active-matrix organic light-emitting diode (AMOLED) display including:

a temperature sensor that is operative for providing a first signal that is based on a temperature of the AMOLED microdisplay;

a voltage controlled oscillator that is operatively coupled with the temperature sensor, the voltage controlled oscillator operative for generating a control signal based on the first signal; and a plurality of pixels, each pixel including an organic light-emitting diode (OLED), wherein a first pixel of the plurality thereof includes a first pixel drive circuit comprising:

a first drive transistor that is configured as a voltage follower, the first drive transistor receiving a first reference voltage and providing a first bias voltage to a first OLED of the plurality thereof, the first bias voltage being based on the first reference voltage; and a first bias transistor that is thermally coupled with the first OLED and that is dimensioned and arranged to:

(1) control a first current through the first drive transistor based on the control signal; and (2) dissipate power by sinking a second current that includes at least a portion of the first current;

wherein the first bias transistor, first drive transistor, and first OLED are directly connected at first node that receives the first current from the first drive transistor and distributes the first current into the second current and a third current that is directed to the first OLED;

wherein the temperature of the first OLED is based on the power dissipated by the first bias transistor.

2. The AMOLED display of claim 1 wherein the temperature of the first OLED is further based on the power dissipated by the first drive transistor, and wherein the power dissipated by the first drive transistor is based on the first current.

3. The AMOLED display of claim 1 wherein a second pixel of the plurality thereof includes a second pixel drive circuit comprising:

a second drive transistor that is configured as a voltage follower, the second drive transistor receiving a second reference voltage and providing a second bias voltage to a second OLED of the plurality thereof, the second bias voltage being based on the second reference voltage; and a second bias transistor that is dimensioned and arranged to:

(1) control a fourth current through the second drive transistor based on the control signal; and (2) dissipate power by sinking a fifth current that includes at least a portion of the fourth current;

wherein the second bias transistor, second drive transistor, and second OLED are directly connected at second node that receives the fourth current from the second drive transistor and distributes the fourth current into the fifth current and a sixth current that is directed to the second OLED;

wherein the temperature of the second OLED is based on the power dissipated by the second bias transistor.

4. The AMOLED display of claim 3 wherein the temperature of the second OLED is further based on the power dissipated by the second drive transistor, and wherein the power dissipated by the second drive transistor is based on the fourth current.

5. The AMOLED display of claim 1 wherein the first drive transistor is dimensioned and arranged to dissipate power based on the first current, and wherein the temperature of the first OLED is further based on the power dissipated by the first drive transistor.

6. The AMOLED display of claim 1 wherein:

the first bias transistor is an NMOS transistor having a first gate, first source, and first drain, wherein the first gate receives the control signal;

the first drive transistor is an NMOS transistor having a second gate, second source, and second drain, wherein the second gate is electrically coupled to the first reference voltage, and wherein the second source is directly connected with the OLED and the first drain via the first node.

7. The AMOLED display of claim 6 wherein the first bias transistor is dimensioned and arranged to provide a minimum load for the first drive transistor.

8. An active-matrix organic light-emitting diode (AMOLED) display comprising:

a temperature control system that provides a control signal based on a temperature of the AMOLED display, the temperature control system including;

a temperature sensor that is operative for providing a first signal that is based on a temperature of the AMOLED microdisplay; and a voltage controlled oscillator that is operatively coupled with the temperature sensor, the voltage controlled oscillator being operative for generating the control signal based on the first signal; and a plurality of pixels, each pixel including an organic light-emitting diode (OLED) and a self-heating pixel drive circuit that comprises;

a bias transistor that draws a first current whose magnitude is based on the control signal, wherein the power dissipated in the bias transistor is based on the magnitude of the first current; and a drive transistor that provides a second current that is based on the first current, wherein the power dissipated in the drive transistor is based on the magnitude of the second current;

wherein the bias transistor, drive transistor, and OLED are directly connected at a first node that receives the second current from the drive transistor and distributes the second current into the first current and a third current that is directed to the first OLED;

wherein the temperature of each OLED of the plurality thereof is based on the power dissipated in its respective self-heating pixel drive circuit.

9. A method for controlling the temperature of an active-matrix organic light-emitting diode (AMOLED) display that includes a plurality of pixels, each pixel including an organic light-emitting diode (OLED) and a pixel drive circuit, the method comprising:

(1) providing a control signal that is based on a temperature of the AMOLED display, wherein the control signal is provided by operations comprising:

sensing the temperature;

generating a first signal based on the sensed temperature;

providing the first signal to a voltage controlled oscillator that generates the control signal based on the first signal;

(2) providing each pixel drive circuit of the plurality thereof such that it is thermally coupled with its respective OLED, wherein each pixel drive circuit of the plurality thereof includes;

a drive transistor having a gate; and a bias transistor that is directly connected with the gate of the drive transistor, wherein the bias transistor controls the forward bias of the drive transistor based on the control signal;

wherein the power dissipation in the pixel drive circuit is based on the forward bias of the drive transistor; and (3) controlling the power dissipated in each pixel drive circuit based on the control signal.

10. The method of claim 9 further comprising providing a first pixel drive circuit of the plurality thereof such that it includes:

a first drive transistor that provides a first bias voltage to a first OLED of the plurality thereof, wherein the first drive transistor is configured as a voltage follower; and a first bias transistor that is thermally coupled with the first OLED, the first bias transistor being dimensioned and arranged to (1) control the flow of a first current through the first drive transistor and (2) generate heat based on a second current that includes a portion of the first current, wherein the magnitude of each of the first current and second current is based on the control signal;

wherein the first bias transistor and the first drive transistor are directly connected at first node that receives the first current from the first drive transistor and distributes the first current into the second current and a third current that is directed to the first OLED.

11. The method of claim 10 wherein the first drive circuit is provided such that the first drive transistor is dimensioned and arranged to generate heat based on the magnitude of the first current.

12. The method of claim 11 wherein the first drive circuit is provided such that:

the first bias transistor is an NMOS transistor having a first gate, first source, and first drain, wherein the first gate receives the control signal; and the first drive transistor is an NMOS transistor having a second gate, second source, and second drain, wherein the second gate is electrically coupled to the first reference voltage, and wherein the second source is directly connected with the OLED and the first drain.

* * * * *